United States Patent [19]

Bachle

[11] 4,320,882
[45] Mar. 23, 1982

[54] CLAMP FOR GROUNDING AND CLAMPING A CONDUIT TO A SUPPORT MEMBER

[75] Inventor: Walter W. Bachle, Harwinton, Conn.

[73] Assignee: General Signal Corporation, Stamford, Conn.

[21] Appl. No.: 108,860

[22] Filed: Dec. 31, 1979

Related U.S. Application Data

[63] Continuation of Ser. No. 891,239, Mar. 29, 1978.

[51] Int. Cl.³ .......................... F16L 3/24; H01R 4/46
[52] U.S. Cl. ...................................... 248/70; 248/72; 339/265 R
[58] Field of Search ............... 248/62, 72, 228, 226.1, 248/316 R, 316 A, 316 B; 339/14 L, 263 R, 263 L, 265 R, 265 F, 266 R, 266 L, 13

[56] References Cited

U.S. PATENT DOCUMENTS

| | | |
|---|---|---|
| 1,090,190 | 3/1914 | Bell ..................................... 248/72 |
| 1,319,652 | 10/1919 | Korns ................................. 248/72 |
| 1,797,214 | 3/1931 | Mayer et al. .................... 248/72 X |
| 1,877,781 | 9/1932 | Akerlund ............................. 248/72 |
| 1,887,193 | 11/1932 | Buchanan ........................... 339/13 |
| 2,029,149 | 1/1936 | Barnes ........................ 339/265 X |
| 2,376,041 | 5/1945 | Ellerthorpe .......................... 248/72 |
| 3,228,639 | 1/1966 | Korns .................................. 248/62 |
| 3,604,676 | 9/1971 | Weber ........................... 248/72 X |
| 3,667,711 | 6/1972 | Kissel ................................... 248/72 |
| 3,698,798 | 10/1972 | Bolton ............................ 248/226.1 |
| 4,195,806 | 4/1980 | Berry ................................... 248/70 |

FOREIGN PATENT DOCUMENTS 660026 10/1951 United Kingdom .................. 248/72

*Primary Examiner*—Lawrence J. Staab
*Attorney, Agent, or Firm*—George W. Killian

[57] ABSTRACT

A clamp for grounding and clamping a conduit to a support member, such as a cable tray, and comprising a relatively thin pad member interposed between the conduit and the support member. The pad member includes serrations, knurling and/or other surface discontinuities, but is otherwise configured to mate with the conduit and the support member so that when pressure is applied between the mating surfaces a good electrical contact is achieved. The required pressure is provided, for example, by a jaw member and a U-bolt working in combination with the other members such that the jaw contacts the support member opposite at least a portion of the pad in contact with the support member. The ends of the U-bolt pass through the pad and the jaw member so that nuts installed on the ends of the U-bolt cause the conduit to be pressed into the pad. The jaw and the pad securely clamp the support member. The jaw may include arcuate slots and/or a plurality of holes so that its angular relationship, with respect to the pad, may be varied in order to accommodate clamping the conduit at a variety of angles with respect to the support member. The U-bolt may be replaced by a saddle member and a pair of bolts, in which case the threaded ends could be made to point in either direction. The resistance between the conduit and support member is minimized because of the characteristics and proportions of the pad member.

9 Claims, 8 Drawing Figures

CLAMP FOR GROUNDING AND CLAMPING A CONDUIT TO A SUPPORT MEMBER

This is a continuation, of Application Ser. No. 891,239, filed Mar. 29, 1978.

BACKGROUND OF THE INVENTION

1. Field of the Invention

The structure of the present invention has utility for clamping and grounding a conduit to a support member such as a cable tray. The clamping and grounding device is designed to rigidly secure a metallic conduit to a metallic support structure and to provide an electrical ground therebetween which is capable of carrying large fault currents.

2. Description of the Prior Art

Some prior art devices have provided for a separate bonding strap, thereby requiring additional components and increased installation time. Another prior art device which contemplates the elimination of the separate bonding strap provides a specially shaped and modified U-bolt which includes a bent over portion for extending under one side of the support member and which has legs extending through a pair of saddle members between which the conduit may be clamped when nuts are coupled to the threaded ends of the bolts. The grounding connection is achieved by providing threaded holes in the lower saddle member and turning screws therein until the ends of the screws provide a pressure contact with the upper side of the support member. This structure has the disadvantage that if the grounding screws are not tightened, or are not adequately tightened, a satisfactory ground connection may not be achieved. Grounding of the conduit and support member provides two separate and distinct functions. The grounding or bonding of the metallic conduit and the support member, and all other exposed metallic surfaces, helps to provide an equipotential environment wherein the possibility of shock is greatly reduced. However, proper bonding or grounding can also serve to protect equipment and minimize fire hazards. More specifically, a fault condition may connect a live wire to the exposed metallic framework and, depending upon the nature of the fault, current of many thousand amperes can be involved. In order to safely conduct large fault currents, a conduction path of substantial cross-sectional area and low resistance is required. In one prior art device described hereinabove, the grounding is provided by means of a set screw, or screws, bearing on the support member. The current carrying capacity of such screws is limited and, therefore, when there is a large fault current, excessive heating and possible melting of the set screws and/or adjacent support member is probable. This will initiate severe arcing which may cause loss of ground and fire and/or other damage.

SUMMARY OF THE INVENTION

The structure disclosed herein overcomes the difficulties of the prior art device by providing an improved grounding and clamping structure which is more convenient and more economical to use and particularly which provides a current conducting grounding circuit which has substantial cross-sectional area and minimum conducting length, thereby substantially reducing the possibility of causing a hot spot which may result in physical damage and/or the initiation of a fire. More particularly, the present structure includes a pad with an obverse and reverse side which is inserted between the conduit and the support member. The obverse side is generally configured to mate with the conduit and includes serrations and/or knurling to provide an oxide piercing feature and so that when pressure is applied between the pad and the conduit, there will be a substantial number of superior contact points over a large area. The reverse side of the pad is generally configured to mate with the support member which is usually planar, and this side of the pad also includes serrations or knurling for the same function. In order to provide the necessary pressure, a jaw and clamping means are provided. The jaw has an obverse and reverse side and is positioned with a portion of the obverse side of the jaw opposing at least a portion of the pad which is in contact with the support member. Another portion of the jaw contacts either the pad or the conduit. A U-bolt may be used for clamping, with the legs of the U-bolt extending through both the pad and the jaw. When nuts are placed on the U-bolt and tightened against the jaw, pressure will be applied to produce a good electrical contact between the conduit and the pad, as well as between the pad and the support member. If desired, a saddle member may be used in contact with the conduit and diametrically opposed to the pad member. In this case, clamping bolts may be placed through the jaw, pad, and saddle member with the nuts on either the jaw or saddle member side. In a modified structure, the jaw member may include arcuate slots and/or a plurality of holes to facilitate the clamping of a conduit to a support member at any of a wide variety of angles. It should be observed that while the jaw and bolts are at grounding potential, the major current path for a fault current is not through these elements, but is directly from the conduit through the pad to the support member.

Having thus summarized the invention, it will be apparent that it is an object of the invention to provide an improved conduit grounding and clamping device.

It is a more specific objective of the invention to provide an improved conduit grounding and clamping device which is capable of conducting substantial fault currents without overheating.

It is another object of the invention to provide an improved conduit grounding and clamping device wherein the conducting path for fault current has a large cross-sectional area and a minimum conducting length.

It is another object of the invention to provide the aforesaid features in a structure which permits clamping the conduit to the support member at any of a wide variety of angles. Other objects, features, and advantages of the invention will be pointed out more particularly in the following description and claims, and are illustrated in the accompanying drawing which disclose the principles of the invention and preferred embodiments thereof.

BRIEF DESCRIPTION OF THE DRAWING

In order to facilitate reference to the various figures of the drawing, elements have been given identifying reference numbers whose first digit corresponds with the figure number. Furthermore, those elements in FIGS. 2A, 2B, or 2C which correspond, or most nearly correspond, with elements in FIGS. 3A, 3B, or 3C have identifying numbers which correspond except for the first digit. In these figures.

DESCRIPTION OF THE PREFERRED EMBODIMENT

Figure 1:
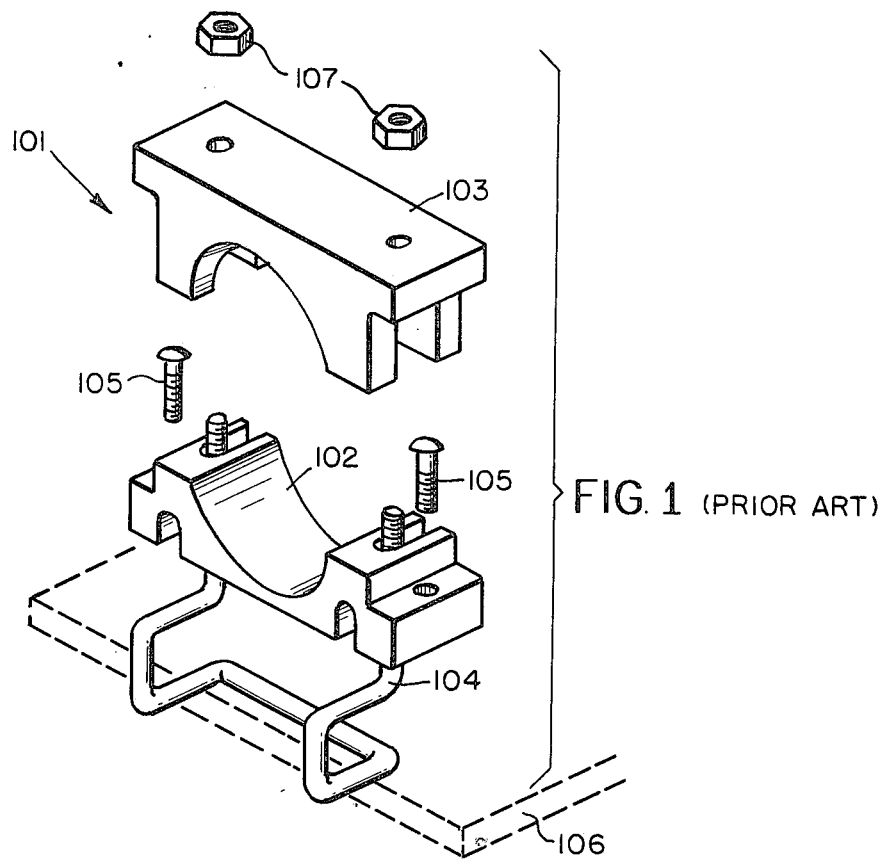
FIG. 1 is a perspective view of a prior art device.

Considering now more specifically the prior art device as shown in an exploded perspective view in FIG. 1, there will be seen a grounding and clamping device indicated generally as 101 and including a lower saddle portion 102, an upper saddle portion 103, clamping means 104, and grounding screws 105. Shown dotted is a member 106 comprising a portion of the support member to which the device 101 is to be clamped. It will be evident that the conduit is placed between the upper and lower saddle members 103 and 102, respectively, and that the threaded ends of the clamping means 104 extend through the upper saddle portion 103 and the nuts 107 are attached for securely clamping the conduit between the upper and lower saddles. The structure may then be slipped over the member 106 and the grounding screws 105 tightened in the threaded holes in saddle member 102 to bear against the member 106 and create a grounding connection between the device 101 and the member 106. Thus the conduit (not shown) makes contact with the lower saddle 102 which in turn is in contact with the screws 105 which project below the lower surface of the saddle member 102 to contact the support member 106, thereby completing the electrical grounding connection from the conduit to the support member 106 through the lower ends of the screws 105.

There is an alternate parallel path through the clamping means 104. The combined cross sectional conducting area is limited, and therefore, the current density, in response to a large fault current, will be large, resulting in possible overheating and melting of the conduction path.

Figure 2A:
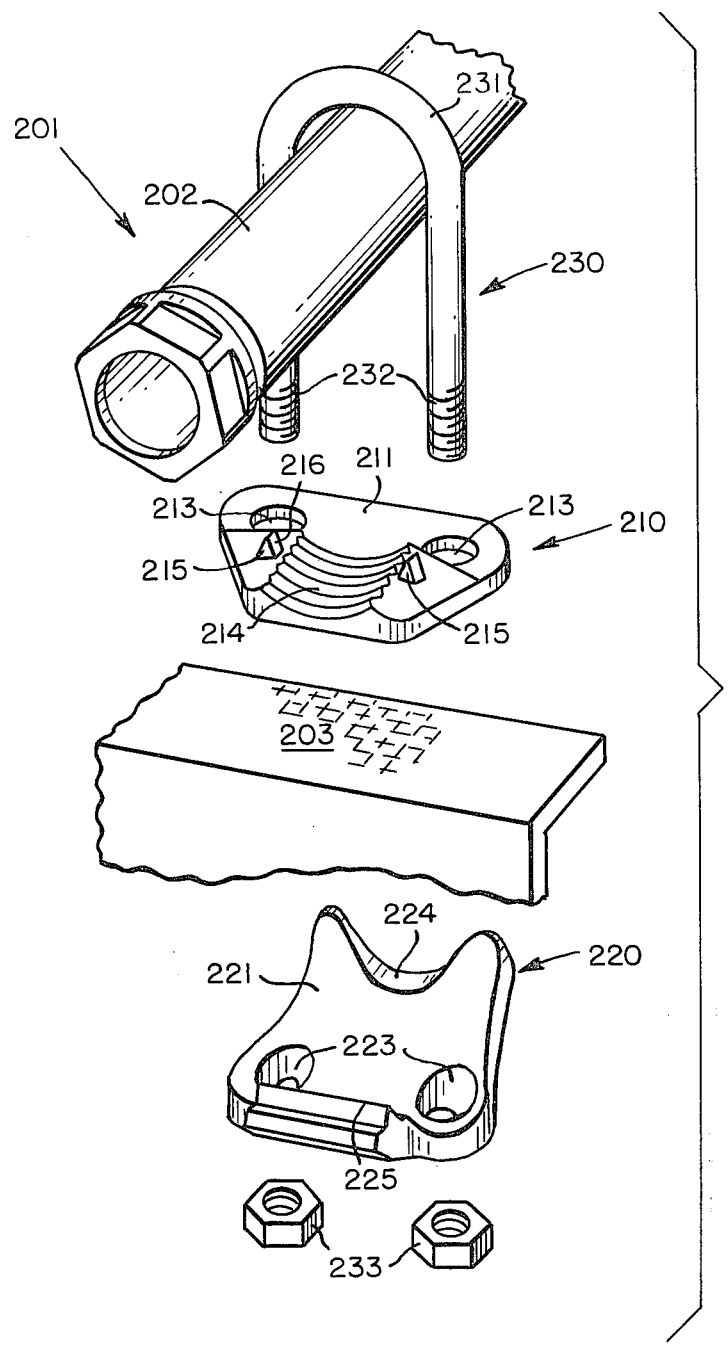
FIG. 2A is an exploded perspective view of one embodiment of the invention.

Considering now more specifically FIG. 2A, there will be seen therein an exploded perspective view of a grounding and clamping device generally indicated as 201 which may be used for grounding and clamping a conduit 202 to a support member 203. The device 201 will be seen to include a pad indicated generally as 210, a jaw indicated generally as 220, and a U-bolt clamping means indicated generally as 230. The pad 210 will be seen to comprise an obverse side 211 and a reverse side 212 shown more clearly in FIG. 2C. As seen in FIG. 2C, the reverse side 212 of pad 210 includes, on a substantial portion thereof, serrations or knurling or other minor surface discontinuities which serve a function to be described more fully hereinafter. The pad 210 has two holes 213 and a saddle portion 214. The saddle portion 214 of the pad 210 may be fabricated with a general configuration which is cylindrical and which will substantially mate with the conduit 202. However, the saddle portion 214 includes minor surface irregularities which may be produced by serrations, knurling, threading, or casting. The surface irregularities of the saddle 214 provide oxide piercing and numerous points of pressure contact and improved electrical connection and clamping between the pad 210 and the conduit 202 when assembled in the manner to be described more fully hereinbelow. The pad 210 also includes guide members 215 each having a surface 216 (seen most clearly in the left hand guide member 215) which serves to help guide and orient the assembly of the pad 210 and the conduit 202 to assure appropriate mating contact.

As may be seen in FIG. 2A, this separation between the obverse side 211 and the reverse side 212 is small as compared with the width and/or length. This provides adequate strength and rigidity while assuring minimum resistance between the obverse side 211 and the reverse side 212. Or phrased differently, the cross-sectional area of the pad 210 included in a first plane passing between the obverse and reverse sides will be approximately an order of magnitude larger than the minimum cross-sectional area of the conducting portion of the pad 210 included in a second plane perpendicular to said first plane. In referring to an order of magnitude it is intended to suggest that the referenced areas differ by a ratio generally falling within the range of 6 or 7 to 13 or 14.

The jaw 220 includes an obverse side 221 and a reverse side 222 (best seen in FIG. 2B), holes 223 and a saddle 224. The jaw 220 also includes a clamping edge 225.

The U-bolt clamping means 230 includes a saddle portion 231 and threaded legs 232 which are spaced apart to pass through the holes 213 of the pad 210 and through the holes 223 of the jaw 220 so that the nuts 233 may be threaded thereon to complete the assembly.

Figure 2B:
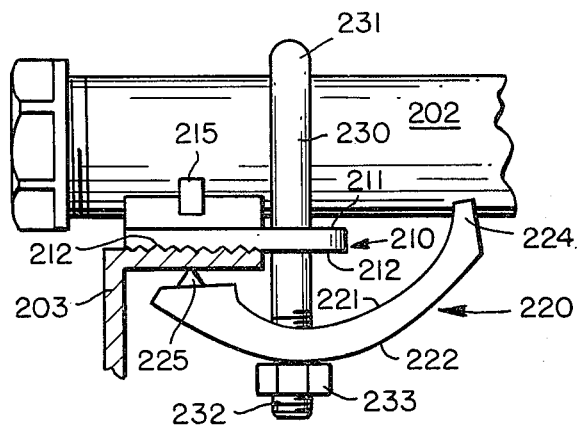
FIG. 2B is a side elevation of the grounding and clamping device of FIG. 2A shown in assembled form.
Figure 2C:
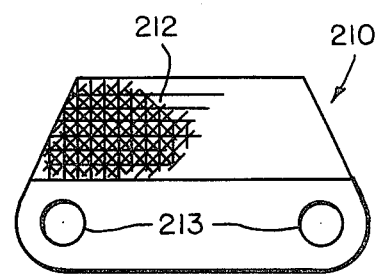
FIG. 2C is a view of the reverse of the pad element shown in FIGS. 2A and 2B.

As may be more clearly seen in the assembled view of FIG. 2B, the U-bolt clamping means 230 and the nuts 233 complete a clamping assembly, whereby the nuts 233 bear on the reverse side 222 of the jaw 220 while the saddle 231 bears on the conduit 202. When the nuts 233 are adequately tightened, the clamping edge 225 will apply a pressure on the underside of the support member 203 and cause the reverse side 212 of the pad 210 to bite into the support member 203 to bite through any oxide and create multiple points of good electrical contact between the pad 210 and the support member 203. In similar fashion, the saddle 214 presses against the conduit 202 and provides a good electrical connection between the conduit 202 and the saddle 214 of the pad 210. It will be evident that the conduction path from the conduit 202 to the support member 203 is through the pad member 210 and that the electrical path between the conduit 202 and the support member 203 is relatively short comprising only the thickness of the pad 210. Substantial portions of the saddle area 214 makes contact with the conduit 202 and substantial portions of the reverse side 212 of the pad 210 makes contact with the support member 203, thereby providing reduced current density and increased current carrying capacity through a short path of low resistance, thereby providing a structure with a minimum tendency to produce hot spots and possible metal vaporization, melting and/or arcing, thereby preventing the initiation of a fire and/or other physical damage.

Figure 3B:
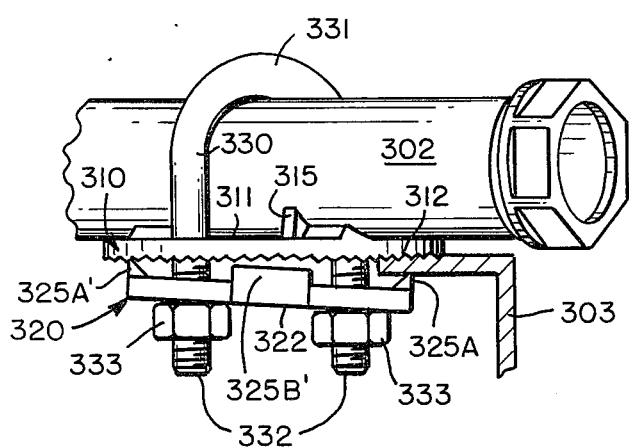
FIG. 3B is a side elevation of the structure of FIG. 3A shown in assembled form.
Figure 3C:
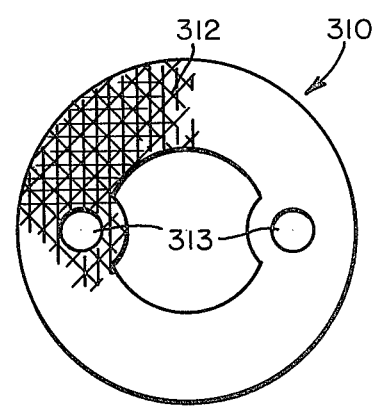
FIG. 3C is a view of the reverse side of the pad shown in FIGS. 3A and 3B.
Figure 3A:
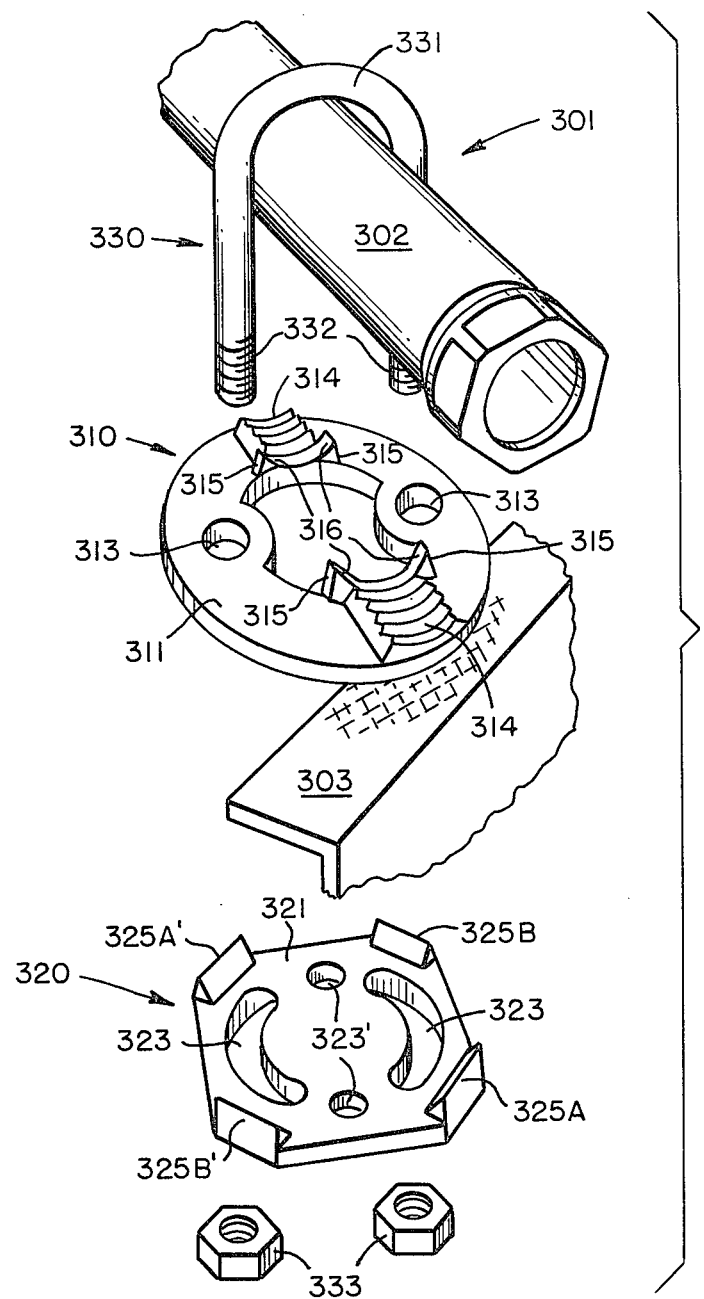
FIG. 3A is an exploded perspective view of an alternate embodiment of the invention.

Considering now more specifically FIG. 3A, there will be seen therein an exploded perspective view of a grounding and clamping device indicated generally as 301 and which may be used for grounding and clamping a conduit to a support member 303. While there are differences between the devices 201 and 301, several similarities will be noted and for convenience in understanding and comparing those elements of FIG. 3 which correspond with similar elements of FIG. 2, they will be given identification numbers which differ only in their first digits. The device 301 will be seen to include a pad indicated generally as 310, a jaw indicated generally as 320, and a U-bolt clamping means indicated generally as 330. The pad 310 will be seen to comprise an obverse side 311 and a reverse side 312 shown more clearly in FIG. 3C. As seen in FIG. 3C, the reverse side 312 of pad 310 includes serrations or knurling or other minor surface discontinuities which serve a function to be described more fully hereinafter. The pad 310 has two holes 313 and a pair of saddle portions 314. It will be recalled that the pad 210 had a single saddle portion 214. The saddle portions 314 of the pad 310 may be fabricated with a general configuration which is cylindrical and which will substantially mate with the conduit 302. However, the saddle portions 314 include minor surface irregularities which may be produced by serrations, knurling, threading, or casting. The surface irregularities of the saddles 314 provide oxide piercing and numerous points of pressure contact and improved electrical connection and clamping between the pad 310 and the conduit 302 when assembled in the manner to be described more fully hereinbelow. The pad 310 also includes guide members 315, each having a surface 316 which serves to help guide and orient the assembly of the pad 310 and the conduit 302 to assure proper mating contact. Except for the saddle portions 314, the pad 310 has a generally uniform thickness between the obverse and reverse side sufficient to provide adequate strength and rigidity and to provide minimum electrical resistance between the sides as explained with respect to pad 210.

The jaw 320 includes an obverse side 321 and a reverse side 322 (best seen in FIG. 3B), holes 323, 323' and a plurality of clamping edges 325A, 325' and/or, 325B, and 325'. The U-bolt clamping means 330 includes a saddle portion 331 and threaded legs 332 which are spaced apart to pass through the holes 313 of the pad 310 and through the holes 323 of the jaw 320 so that the nuts 333 may be threaded thereon to complete the assembly.

As may be more clearly seen in the assembled view of FIG. 3B, the U-bolt clamping means 330 and the nuts 333 complete a clamping assembly, wherein the nuts 333 bear on the reverse side 322 of the jaw 320.

As may be seen, the pad 310 and the jaw 320 differ in some respects from the pad 210 and jaw 220. More specifically, the pad 310 will be seen to include two saddle portions 314 whereas the pad 210 had a single saddle portion 214. The jaw 320 has at least one pair of clamping edges. Two pairs of clamping edges 325A, 325A', and 325B, 325B' are shown. The jaw 220 had a single clamping edge 225. The primary reasons for these differences is to allow clamping of the conduit 302 at a wide range of angles with respect to the support member 303. Examination of the structure of FIGS. 2A and 2B will show that if the conduit 202 is oriented at an angle substantially different from 90° with respect to the member 203, that relatively little of the reverse side 212 of the pad 210 will contact the member 203 and, furthermore, a portion of the clamping edge 225 may not be in contact with the underside of the support member 203. This could result in an inadequate gripping and grounding connection.

Considering now more specifically the modified structure as illustrated in FIGS. 3A and 3B, it will be seen that the jaw member 320 includes elongated arcuate slots 323 and/or a plurality of hole pairs 323' through which the bolt legs 332 pass and, accordingly, at least limited rotation of the jaw 320 is possible so that irrespective of the angle of the conduit 302, with respect to the member 303, one of the clamping edges 325A, 325A', 325B or 325B' may be in full and complete clamping contact with the underside of the support member 303. Judicious placement of the clamping edges 325A, 325A', and/or 325B, 325B', and the slots 323 and/or holes 323' will permit the jaw 320 to be rotated a full 360° to accommodate clamping of the conduit 302 to the member 303 at any desired angle.

It will also be seen that the pad 310 includes two saddle portions 314, one on each side of the U-bolt 330. To mount the conduit 302 to the member 303, the U-bolt clamping means 330, the conduit 302, and the pad 320 rotate as a unit with respect to member 303 and the jaw 320. The jaw member 320 remains substantially stationary with one of its clamping edges, such as 325A, parallel with the longitudinal axis of the member 303. The opposite clamping edge 325A' contacts the pad 310 and when the nuts 333 are tightened, the forces developed by these nuts will develop a resulting clamping force which is approximately in the center of the clamp 330. That is, the force will be divided between the two clamping edges 325A and 325A' or 325B and 325B' which ever pair of clamping edged are selected to act on the pad 310 and member 303.

It will be evident that in place of arcuate slots 323 it would be possible to use a plurality of diametrically opposed holes 323' to provide substantially the same adjustments.

From the foregoing description of the structure of FIGS. 3A and 3B, it will be seen that when the conduit 302 is at an angle of other than 90°, with respect to the support member 303, that the pair of clamping edges used will not lie directly under the conduit 302 or under the saddle portions 314 of the pad 310. Accordingly, the jaw 320 cannot be provided with a saddle similar to saddle 224 on jaw member 220.

Because of the serrations on the saddles 314 and the reverse side 312 of the pad 320, multiple contacts will be made between the pad 310 and the conduit 302 and also between the pad 310 and the member 303. It will be evident that the conduction path from the conduit 302 to the support member 303 is through the pad member 310 and that the electrical path between the conduit 302 and the support member 303 is relatively short comprising only the thickness of the pad 310. Accordingly, the structure 301 provides the same improved grounding characteristics as those set forth for structure 201. Although there is an electrical circuit from the conduit 302 through the U-bolt 330 and the nuts 333 to the jaw 320 and the support member 303, it will be appreciated that this is merely an auxiliary parallel path and that the primary grounding path is that previously described through the pad member.

Figure 4:
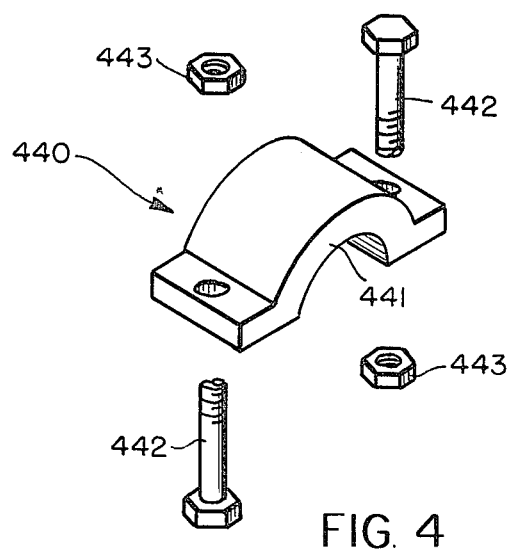
FIG. 4 comprises an alternate structure which may be substituted for part of the assemblies of FIGS. 2A, 2B, 3A, and 3B.

Considering now more specifically FIG. 4, there will be seen an upper saddle indicated generally as 440 and which includes an arch 441 generally configured to mate with a conduit. The upper saddle 440 may be used in place of the U-bolt 230 or 330 in FIG. 2A or 3A and two straight bolts 442 used in place of the legs 232 or 332. As illustrated in FIG. 4, when the saddle 440 is used, the bolts 442 may be pointed either up or down. Thus, if circumstances are such that it is inappropriate to have the legs 332 or 232 or the U-bolt extending downward, an upper saddle 440 with bolts 442 pointing upward could be used. In such application, the bolts 442 would be placed first through the jaw member 220 or 320 and thence through the pad member 210 or 310 and then through the upper saddle 440 and the nuts 443 screwed onto the bolts 442. Cap nuts could be used in place of the illustrated nuts to protect adjacent wires from possible abrasion on the threads.

It will also be evident to those familiar with structures of this class, that instead of using an arch 441, the upper saddle may comprise a general V-shape whereby a single arch 440 may be used to accommodate a plurality of conduit sizes. In addition, it will be evident that the saddle 224 of the jaw 220 could have a V-shape rather than an arcuate saddle shape, thereby providing a jaw which may be used with a wide variety of conduit sizes. In a similar manner, the saddle portion 214 and 314 of their respective pads 210 and 310 may have a V-shape. However, it should be understood that this may materially reduce the area of contact between the saddle and the conduit and thereby reduce the fault current capacity of the device. Accordingly, such modification should only be used when the possible magnitude of the fault current is sufficiently limited.

While there has been shown and described what is considered at present to be preferred embodiments of the invention, modifications will readily occur to those who comprehend the problem and the concepts of the invention. For example, it will be evident that proportions may be varied, or other modifications made, to meet the exigencies of the problem at hand. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A conduit and ground clamping device for grounding and clamping a conduit to a structural member and comprising in combination:
    (a) a pad member;
    (b) a jaw member; and
    (c) a clamp member; wherein
    (d) said pad member comprises a solid conducting member, albeit possibly including some perforations for expeditous assembly with said jaw and clamp members, and proportioned so that the cross sectional area of the conducting portion of said pad and which is included in a plane between opposed obverse and reverse sides is an order of magnitude greater than the minimum cross sectional area of the conducting portion of said pad included in a second plane perpendicular to said first plane;
    (e) said obverse and reverse sides of said pad having a substantial portion of the surface area thereof configured to make electrical contact with a conduit and a first side of a structural member, respectively, when placed in contact therewith for reducing the electrical contact resistance between said conduit and said pad and between said pad and said structural member;
    (f) said jaw member having obverse and reverse sides with said obverse side of said jaw including first and second clamping edges for engagement with a second side of the structural member, opposite said first side, and for contacting the reverse side of said pad, respectively, when said jaw is placed in contact with said second side and when pressure is applied therebetween and wherein said jaw may be coupled to said pad by said clamp member at selected positions of relative rotation between said jaw and said pad by including a plurality of holes for allowing said relative rotation;
    (g) said clamp member serving to couple said pad member and said jaw for applying pressure between the enumerated members when the conduit and ground clamping device is assembled in combination with a conduit and structural member; whereby
    (h) the electrical resistance between a conduit and a structural member is minimized.

2. The combination as set forth in claim 1, wherein said portion of said pad on the obverse side of said pad makes multiple contact with a conduit of predetermined configuration placed in contact therewith.

3. The combination as set forth in claim 1 or 2 wherein said portion of said pad on the reverse side of said pad makes multiple contact with a structural member of predetermined configuration placed in contact therewith.

4. The combination as set forth in claim 3, wherein said obverse and reverse sides of said pad include serrations, or the like, for providing oxide piercing and improved clamping.

5. The combination as set forth in claim 1, wherein said clamp member comprises a threaded U-bolt and nuts.

6. The combination as set forth in claim 1, wherein said clamp member comprises a saddle member, bolts, and nuts.

7. The combination as set forth in claim 1, wherein said jaw includes a saddle portion for contacting a conduit.

8. The combination as set forth in claim 1, wherein said holes of said jaw include an elongated slot for allowing said relative rotation.

9. The combination as set forth in claim 1, wherein said slot forms an arc.

* * * * *